United States Patent [19]

Olsen

[11] 4,268,822

[45] May 19, 1981

[54] APPARATUS FOR DETERMINING THE STATE OF EACH OF A PLURALITY OF BI-STATE DEVICES

[75] Inventor: Everett O. Olsen, Wrentham, Mass.

[73] Assignee: The Foxboro Company, Foxboro, Mass.

[21] Appl. No.: 952,525

[22] Filed: Oct. 18, 1978

[51] Int. Cl.³ .............................................. G08B 1/08
[52] U.S. Cl. ................................ 340/533; 340/171 R; 340/505; 340/506; 340/518; 340/531
[58] Field of Search .............. 340/500, 506, 533, 508, 340/511, 509, 518, 531, 536, 152 T, 151, 171 R, 171 A, 183

[56] References Cited

U.S. PATENT DOCUMENTS

| | | | |
|---|---|---|---|
| 2,581,056 | 1/1952 | Walmsley et al. | 340/171 R |
| 2,842,753 | 7/1958 | Ewen | 340/518 |
| 3,550,090 | 12/1970 | Baker et al. | 340/505 |
| 3,644,927 | 2/1972 | Green | 340/518 |
| 3,662,335 | 5/1972 | Fritze | 340/58 |
| 3,716,834 | 2/1973 | Adams | 340/518 |
| 3,739,376 | 6/1973 | Keledy | 340/531 |
| 3,895,369 | 7/1975 | Ono et al. | 340/310 R |
| 4,027,286 | 5/1977 | Marosko | 340/171 R |

Primary Examiner—John W. Caldwell, Sr.
Assistant Examiner—Donnie L. Crosland
Attorney, Agent, or Firm—Lawrence J. Dion, Jr.; Andrew T. Karnakis

[57] ABSTRACT

In a system for determining the state of each of a plurality of bi-state devices located remotely from a central station, a group of resonant circuits is connected to a multi-frequency excitation source. A bi-state device is then connected to each resonant circuit. When a particular bi-state device is in one position and its corresponding resonant circuit is being excited by its resonant frequency, a maximum amplitude signal is produced by the resonant circuit. When the bi-state device is in the other position, a lesser amplitude signal is produced. The signal produced by each resonant circuit is fed to detection circuitry and in turn to display circuitry. Thus the state of each of the plurality of bi-state devices is indicated by the display circuitry.

The two wire line in addition may serve as a transmission medium for a DC control signal used for controlling a remotely located process control valve or for controlling other final actuators.

24 Claims, 7 Drawing Figures

APPARATUS FOR DETERMINING THE STATE OF EACH OF A PLURALITY OF BI-STATE DEVICES

FIELD OF THE INVENTION

This invention relates generally to monitoring the status of a plurality of bi-state devices. More particularly the invention relates to the use of resonant circuits for sensing over a two wire line the state of bi-state devices that are remotely located from a central station.

BACKGROUND OF THE INVENTION

The use of a single two wire transmission line for determining the state of each of a plurality of bi-state devices has been proposed in the prior art. For example, U.S. Pat. Nos. 4,027,286 (Morosko), 3,550,090 (Baker) and 3,895,286 (Ono), all disclose the use of resonant circuits in conjunction with the two wire line. In addition Morosko employs phase comparison electronics in his detector circuitry for determining the state of each bi-state device. Baker and Ono, on the other hand, employ amplitude comparison electronics in their detector circuitry. However, the resonant circuits of Baker and Ono are connected in parallel with each other and the excitation source.

Notwithstanding the resonant detection techniques disclosed above, improvements are needed to enable these sensors to perform more satisfactorily under a wider variety of intended applications.

SUMMARY OF THE INVENTION

In one aspect of the present invention a series of equal duration square wave trains, each of a different frequency, are sequentially generated and transmitted over a two wire line to a remotely located group of parallel resonant LC circuits whose inputs are serially connected. A separate two position micro-switch is connected to each LC circuit to provide for switching in additional capacitance to the LC circuits. Each individual LC circuit is designed to respond to only one of the generated frequencies. Further each circuit will respond in a resonant manner when its associated micro-switch is in the open position and in an off-resonant manner when the micro-switch is in the closed position. Consequently, the appearance of a maximum amplitude signal at the input of an LC circuit will indicate its two position micro-switch is open and correspondingly the appearance of a lesser amplitude signal will indicate the micro-switch is closed. The signal appearing at the input of each LC circuit is presented to a detector circuit for processing and conversion to a form suitable for display.

In another aspect of the present invention, a process control system utilizes a two wire line to transmit a DC control signal to an operator, such as a valve, simultaneously with a series of AC excitation signals to a group of parallel resonant LC circuits. Each LC circuit is connected to a two position micro-switch which in turn represents a limit on the operation of the control valve. In operation, the DC control signal is transmitted through the resonant circuits to a valve operator which adjusts the position of the valve accordingly. If a particular prescribed limit is reached, a corresponding change in the position of the two position micro-switch is detected in the manner described in the proceeding paragraph.

BRIEF DESCRIPTION OF THE DRAWINGS

FIG. 6($b$) shows a diagramatic representation of a variable inductor and associated two position actuator for the embodiment of FIG. 5 where the actuator is in the other position.

DESCRIPTION OF THE EMBODIMENTS

Figure 1:
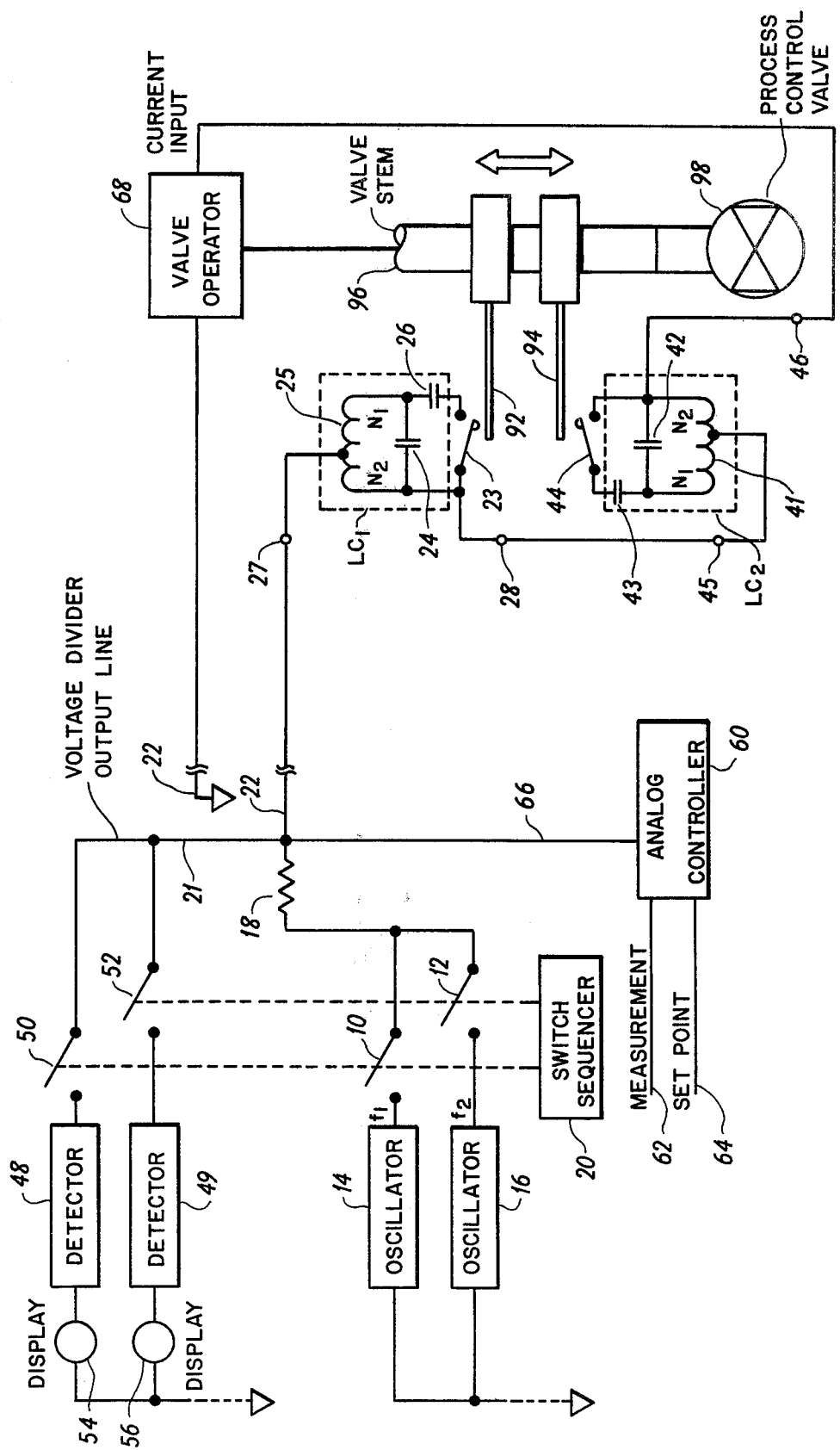
FIG. 1 shows a schematic/block diagram of an apparatus for determining the state of each of a plurality of bi-state devices that are remotely located over a two wire line from their corresponding display units in combination with a process control loop that uses the same two wire line for transmission of a DC control signal.

Referring now to FIG. 1, one embodiment of the present invention is shown in modified block diagram form. A process control system is shown in combination with a system for detecting limits on the operation of a process control valve. A central station, where data showing the presence or absence of the limit conditions is displayed, is connected by a two wire line to a remotely located process field containing the process control valve.

Switches 10 and 12 connect square wave oscillators 14 and 16 of frequency $f_1$ $f_2$ respectively to a resistor 18. The switches 10 and 12 are operated by a switch sequencer 20. Each switch is closed at a different time for a similar but non-overlapping period of time thereby generating sequential square wave trains of frequencies $f_1$ and $f_2$. These square wave trains are transmitted through the resistor and in turn over a two wire line 22 to a remotely located group of parallel resonant LC circuits whose inputs are serially connected.

LC circuits $LC_1$ and $LC_2$ are shown in detail. These circuits are but two of possible many others but for purposes of understanding only two are described. Circuit $LC_1$ is composed of a tapped inductor 25, a capacitor 24 and a capacitor 26. Circuit $LC_2$ is composed of a tapped inductor 41, a capacitor 42 and a capacitor 43. The reason for use of the tapped inductors will be explained subsequently.

Figure 2:
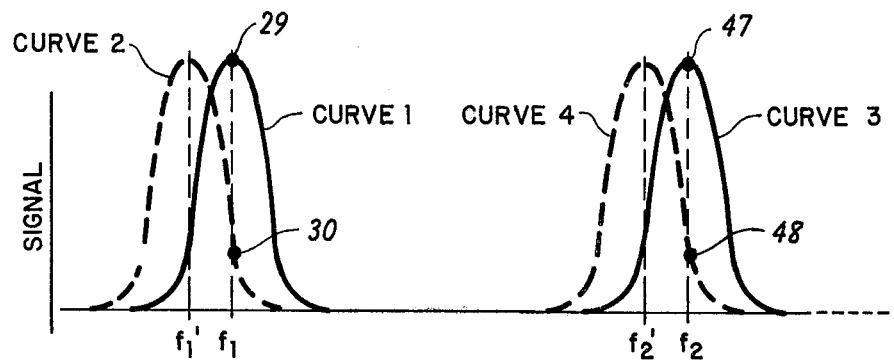
FIG. 2 shows the frequency response curves of the LC circuits shown in FIG. 1.

A two position micro-switch 23 is coupled across $LC_1$ to provide for switching the capacitor 26 into the circuit. The frequency response curves of $LC_1$ are shown in FIG. 2. Curve 1 shows the response when only the capacitor 24 is connected into the circuit. It further shows that $f_1$ is the resonant frequency defined by the inductor 25 and the capacitor 24. Curve 2 shows the response when both capacitors are connected into the circuit. Similarly, $f_1''$ is the resonant frequency defined by the inductor and the two capacitors. When the switch is in the open position and the circuit is being excited by frequency $f_1$, the circuit will respond in a resonant manner and a maximum amplitude signal (shown graphically as point 29) will appear at terminals 27 and 28. Correspondingly, when the switch is closed, the circuit will respond in an off resonant manner and a lesser amplitude signal (shown graphically as point 30) will appear at the terminals.

A two position micro-switch 44 is similarly coupled across $LC_2$ to provide for switching the capacitor 43 into the circuit. The frequency response curves of $LC_2$ are shown as curves 3 and 4 of FIG. 2. In like manner when $LC_2$ is being excited by frequency $f_2$, a maximum amplitude signal (shown graphically as point 47) or a lesser amplitude signal (shown graphically as point 48) will appear at terminals 45 and 46.

A valve stem 96 of a process control valve 98 has a pair of activator arms 92 and 94 fixedly connected to it. The activator arm 92 is in turn arranged so that when its position corresponds to the valve beng wide open, the arm will engage the micro-swtich 23 causing it to assume a closed position. Correspondingly, when the valve is not wide open the micro-switch will assume an open position.

Activator arm 94 is similarly arranged to cause micro-switch 44 to assume a closed position when the valve is fully closed and to assume an open position when the valve is not fully closed.

To allow the maximum number of parallel resonant LC circuits to be used within a given bandwidth of frequencies, high Q inductors are used. This results in minimal LC circuit interaction between $LC_1$ and $LC_2$ because of the insensitivity of $LC_1$ to frequency $f_2$ and $LC_2$ to frequency $f_1$. With the use of high Q inductors the effect of line capacitance becomes more pronounced resulting in the LC circuits responding in an off-resonant manner when they should be responding in a resonant manner. To eliminate this effect the high Q inductors are tapped when appreciable line length is involved. The tap-ratio on the inductors (i.e., $N_1/N_2$) is in the range 5/1 to 20/1. The mid-range valve of 10/1 is the preferred value.

The serially connected LC circuits and the resistor 18 form respective arms of a voltage divider. The output of the voltage divider appears at line 21.

As previously mentioned when frequency $f_1$ is supplied to the LC circuits, a signal will appear at terminals 27 and 28 of $LC_1$. Because of the insensitivity of the other LC circuits to $f_1$, an insignificant signal will appear at the terminals of any of the other LC circuits. Hence, the output of the voltage divider is essentially determined by the response of $LC_1$. The output of the voltage divider is received at a detector 48 when a switch 50 is closed. The switch which is operated by the switch sequencer 20 follows the same close-open sequence as the switch 10. Thus, the voltage divider output will be received at the detector only when frequency $f_1$ is being supplied to the LC circuits. Referring now to the curves of FIG. 2 for clarity, the detector will produce an output only when a signal of amplitude represented by point 29 is present at its input terminals. Therefore, the presence of absence of an output from the detector will indicate whether the micro-switch 23 is open of closed and consequently whether the process control valve 98 is not fully open or fully open. A display unit 54 is connected to the detector for reading out the not fully open or fully open status of the valve.

When frequency $f_2$ is supplied to the LC circuits, the signal that appears at terminals 45 and 46 will be similarly connected through a switch 52 and processed by a detector 49 which operates in a manner similar to the detector 48. The presence or absence of an output from the detector 49 will indicate whether the micro-switch 44 is open or closed and consequently whether the valve 98 is not fully closed or fully closed. A display unit 56 is connected to the detector 49 for reading out the not fully closed or fully closed status of the valve.

Figure 3:
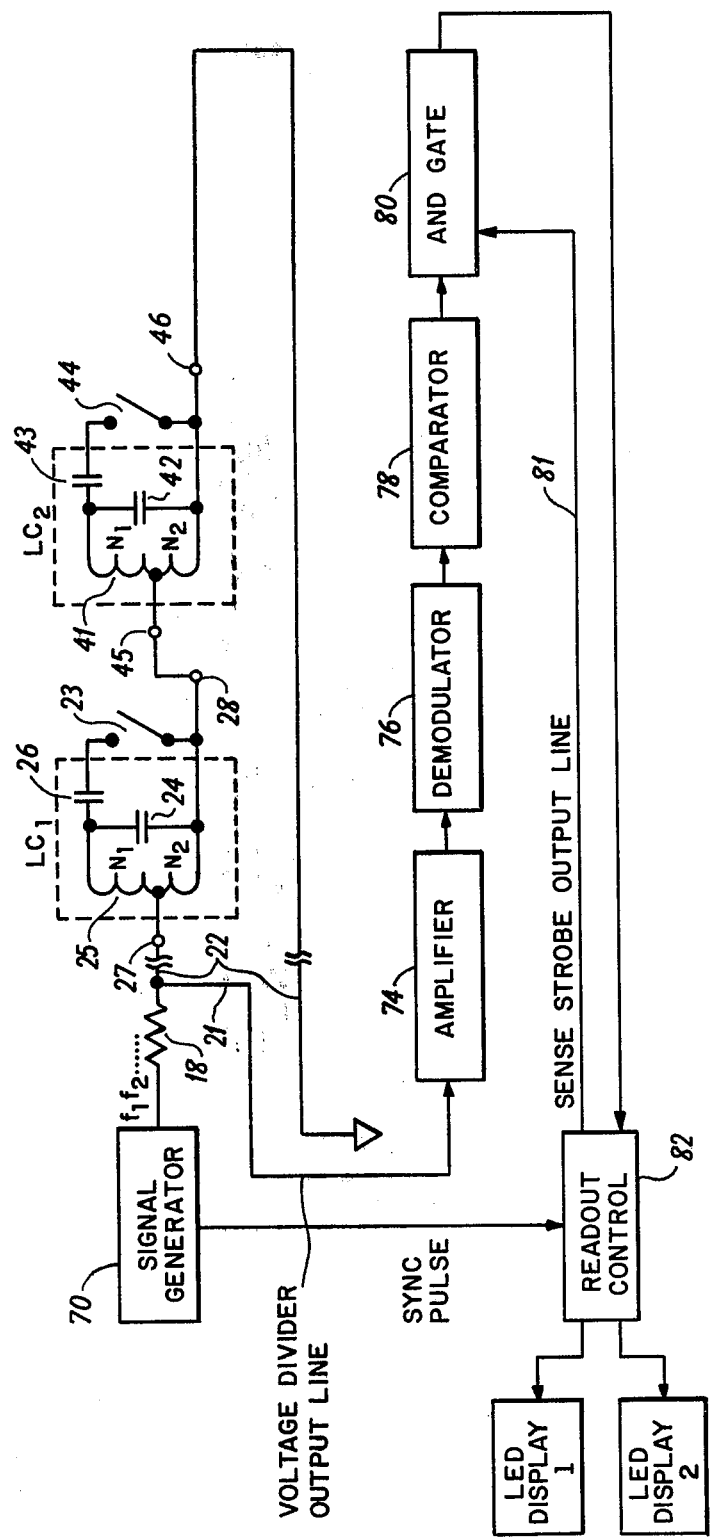
FIG. 3 shows more detailed features of the excitation and detection circuitry of the apparatus of FIG. 1.

In addition to detecting limits on the operation of the process control valve 98, the two wire line 22 is used to transmit a DC control signal for use in a process control loop. A conventional analog controller 60 receives two inputs, a measurement signal 62 which is indicative of an actual value of the process variable desired to be controlled and a set point signal 64 which is indicative of a preselected desired value of the process variable. The controller 60 produces on line 66 a DC current control signal which is a function of the difference between the measurement signal 62 and the set point signal 64. The DC control signal is in turn transmitted over the two wire line 22 through the LC circuits to an input of a valve operator 68. The output of the valve operator 68 controls the position of the process control valve 51 thereby altering the process variable so that the difference between the measurement signal 62 and the set point signal 64 is reduced towards zero. Referring now to FIG. 3, more detailed features of the excitation and detection circuitry of the apparatus of FIG. 1 are presented.

A signal generator 70 generates in a sequential manner equal duration square wave trains, each of a different frequency (i.e., $f_1, f_2 \ldots$) The square wave trains are transmitted through the resistor 18 and in turn over the two wire line 22 to a remotely located group of serially connected parallel resonant LC circuits.

As previously mentioned when the LC circuits are being supplied with frequency $f_1$, the output of the voltage divider will be almost completely determined by the response of $LC_1$. If the micro-switch 23 is open a maximum amplitude signal will be present on the line 21. If the micro-switch is closed a lesser amplitude signal will be present on the line 21. The output of the voltage divider is presented as an input to an amplifier 74 for amplification. The output of the amplifier is then fed to a demodulator 76. The output of the demodulator will be a positive pulse of duration equal to the duration of an individual square wave train. In addition, the pulse height will be equal to a maximum value if the switch is open or a lesser value if the switch is closed. The output of the demodulator is fed to the signal input of a comparator 78 which is biased at a level to allow the pulse output of the demodulator to drive it to a logic "high" when the pulse height is a maximum value and to a logic "low" when the pulse height is a lesser value. The output of the comparator is fed to one input of an AND gate 80. The other input to the AND gate is connected to a sense strobe output line 81 of a readout control 82. The signal generator 70 in addition to generating square wave trains will also produce a sync pulse during the duration of each square wave train. The sync pulse is fed to the readout control which in turn produces a sense strobe output pulse on line 81. The output of the comparator which is indicative of the position of the switch is thusly strobed into the readout control. In addition, the sync pulse will index the readout control enabling it to provide an output to an LED display 1 which is indicative of the position of the switch 23.

As is apparent, similar results concerning the position of the micro-switch 44 will be obtained at LED display 2 when frequency $f_2$ is being generated.

The signal generator 70 and the readout control 82 may be embodied by a microprocessor system, such as the Intel 8085 manufactured by The Intel Corporation of Santa Clara, Calif. It is well known to one skilled in the art to design such a microprocessor system to carry out the functions of the signal generator 70 and the readout control 82.

Figure 4:
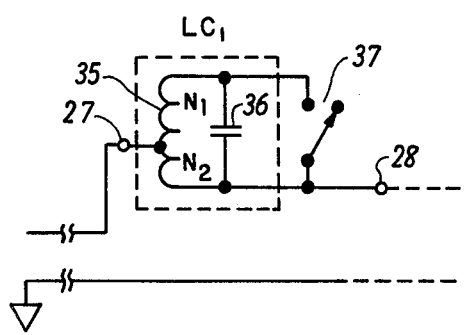
FIG. 4 shows schematically an alternate embodiment of an LC circuit used with the apparatus shown in FIG. 1.

An alternate embodiment of the LC circuit shown in FIG. 1 is presented in FIG. 4. In this particular embodiment the resonant frequency remains constant throughout the entire sensing operation. A tapped inductor 35 and a capacitor 36 form a parallel resonant LC circuit $LC_1$, whose resonant frequency $f_1$ corresponds to the frequency $f_1$ produced by the oscillator 14 of FIG. 1. When a two position switch 37 is in the open position and the LC circuits are being excited by a frequency $f_1$, a maximun amplitude signal will be present at terminals 27 and 28. If the switch is in the closed position, a lesser amplitude signal will be present at terminals 27 and 28. The switch may be replaced by an electronic switch such as an SCR, a photo-diode or a switching transistor.

Figure 5:
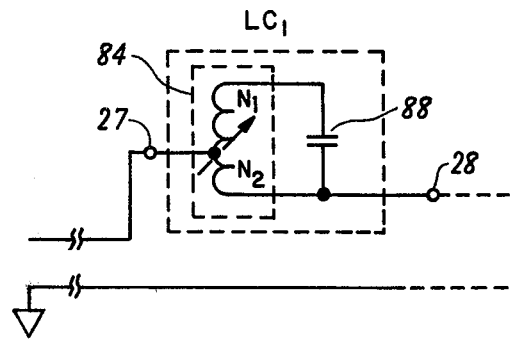
FIG. 5 shows schematically an alternate embodiment of an LC circuit used with the apparatus shown in FIG. 1.

Another alternate embodiment of the LC circuit shown in FIG. 1 is presented in FIG. 5. Referring now to FIG. 5, a variable inductor 84 and a capacitor 88 form parallel resonant LC circuit $LC_1$. When the inductance of the inductor is of a first magnitude, the inductor and capacitor define a resonant frequency $f_1$. This resonant frequency corresponds to the frequency $f_1$ produced by the oscillator 14 of FIG. 1. When the inductance of the inductor is of a second magnitude, the inductor and capacitor define a resonant frequency $f_1'$. This resonant frequency corresponds to none of the frequencies produced by the oscillators of FIG. 1.

Figure 6A:
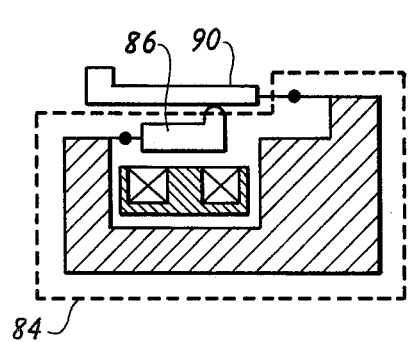
FIG. 6($a$) shows a diagramatic representation of a variable inductor and associated two position actuator for the embodiment of FIG. 5 where the actuator is in one position.
Figure 6B:
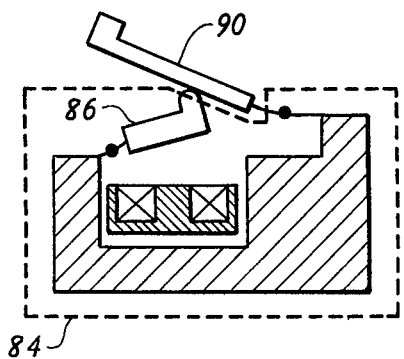

A particular embodiment of the variable inductor shown in FIG. 5 is presented in FIGS. 6(a) and 6(b). In this embodiment no electrical contacts are used and it may be preferrable to use this embodiment in applications where frequent actuation would present an excessive wear problem to electrical contacts or where the atmosphere is explosive and/or conducive to the corrosion of the contacts. Referring now to FIGS. 6(a) and 6(b), the variable inductor 84 is shown having a movable core 88. The inductor is constructed so that the core has only two stable positions. When the core is in one position the LC circuit will have the resonant frequency $f_1$ and when in the other position the resonant frequency $f_1'$. The core is moved from one position to the other by a mechanically coupled actuator 90. The position of the core is used to define the position of the actuator in the same manner the capacitors 24 and 26 of FIGS. 1 and 3 are used to define the position of the micro-switch 23.

Many changes and modifications in the above described embodiments of the present invention may of course be carried out without departing from the scope thereof. Accordingly that scope is intended to be limited only to the scope of the appended claims.

What is claimed is:

1. In a system for detecting at a central station the state of each of a plurality of bi-state devices located in field locations remote from said station; apparatus comprising:

a two-wire line extending from said station to said field locations;

signal-generating means coupled to said two-wire line at said central stations for producing a plurality of a-c excitation signals having different frequencies;

a plurality of field located state sensors for said bi-state devices, respectively, with each sensor having parallel resonant means tuned to the frequency of a corresponding excitation signal assigned thereto;

means coupling all of said parallel resonant means in series with each other and with said two-wire line;

switching means coupled to each bi-state device and the respective parallel resonant means to control the resonance of the respective parallel resonant means so as to produce at the associated state sensor in response to the application of the corresponding excitation signal a field signal having a magnitude dependent upon the state of the respective bi-state device;

detector means coupled to said two-wire line at said central station to develop for each state sensor a control station signal dependent upon the magnitude of the associated field signal and serving to indicate the state of the respective bi-state device.

2. An apparatus as in claim 1 wherein said resonant means includes an inductor and a variable capacitor connected in parallel combination;

said variable capacitor having a capacitance of a first magnitude when said bi-state device is in said first state and a capacitance of a second magnitude when said bi-state device is in said second state.

3. An apparatus as in claim 1 wherein said resonant means includes an inductor, a first capacitor and a second capacitor;

said inductor and said first capacitor being connected in parallel when said bi-state device is in said first state and said inductor, said first capacitor and said second capacitor being connected in parallel when said bi-state device is in said second state.

4. An apparatus as in claim 3 wherein said inductor is tapped.

5. An apparatus as in claim 4 wherein said tapped inductor has a tap ratio in the range of 5/1 to 20/1.

6. An apparatus as in claim 1 wherein said resonant means includes an inductor and a capacitor connected in parallel and said state sensor produces at said input circuit a maximum amplitude signal when said bi-state device is in said first state and a lesser amplitude signal when said bi-state device is in said second state.

7. An apparatus as in claim 6 wherein said inductor is tapped.

8. An apparatus as in claim 7 wherein said tapped inductor has a tap ratio in the range of 5/1 to 20/1.

9. An apparatus as in claim 1 wherein said resonant means includes a capacitor and a variable inductor connected in parallel combination;

said variable inductor having an inductance of a first magnitude when said bi-state device is in said first state and an inductance of a second magnitude when said bi-state device is in said second state.

10. An apparatus as in claim 9 wherein said variable inductor has a movable core operable between first and second limits;

said movable core being positioned at said first limit when said bi-state device is in said first state producing at said input circuit of said state sensor a maximum amplitude signal; and said movable core being positioned at said second limit when said bi-state device is in said second state producing at said input circuit of said state sensor a lesser amplitude signal.

11. An apparatus as in claim 10 wherein said variable inductor is tapped.

12. An apparatus as in claim 11 wherein said variable tapped inductor has a tap ratio in the range of 5/1 to 20/1.

13. In an industrial process instrumentation system comprising a central station having facilities for developing process control signals to be transmitted to remotely-located field instrumentation apparatus, such as a valve control device, and wherein located in the field adjacent such instrumentation apparatus are a plurality of bi-state devices the state of each to be relayed to the central station for use in operating the process instrumentation system;

the improvement comprising:

a two-wire line extending from said central station to said remote field location;

first signal-generating means at said central station for developing a d-c control signal to be transmitted to said field location;

second signal-generating means at said central station for producing a plurality of a-c excitation signals having different frequencies;

means coupling said first and second signal-generating means to said two-wire line to transmit said d-c control signal and said a-c excitation signals to said remote location;

d-c signal-responsive process instrumentation apparatus at said field location and having an input connected in series with said two-wire line to receive said d-c control signal so as to produce a controlled action in accordance with the magnitude thereof;

a plurality of state sensors for said bi-state devices, respectively, with each sensor having an input circuit coupled to parallel resonant means tuned to the frequency of a corresponding excitation signal assigned thereto;

means coupled to the associated bi-state device and operable therewith to control the resonance of the respective parallel resonant means so as to produce at each of said input circuits in response to the application of the corresponding excitation signal, either a first signal or a second signal in accordance with whether the associated bi-state device is in a first state or a second state;

means coupling all of said input circuits in series with each other and with said two-wire line; and detector means coupled to said two-wire line at said central station to develop signals responsive to the magnitude of the signal developed by each of said sensors when activated by said excitation signals and serving to indicate the state of the corresponding bi-state device.

14. An apparatus as in claim 13 wherein said resonant means includes an inductor and a variable capacitor connected in parallel combination;

said variable capacitor having a capacitance of a first magnitude when said bi-state device is in said first state and a capacitance of a second magnitude when said bi-state device is in said second state.

15. An apparatus as in claim 13 wherein said resonant means includes an inductor, a first capacitor and a second capacitor, said inductor and said first capacitor being connected in parallel when said bi-state device is in said first state and said inductor, said first capacitor and second capacitor being connected in parallel when said bi-state device is in said second state.

16. An apparatus as in claim 15 wherein said inductor is tapped.

17. An apparatus as in claim 16 wherein said tapped inductor has a tap ratio in the range of 5/1 to 20/1.

18. An apparatus as in claim 13 wherein said resonant means includes an inductor and a capacitor connected in parallel and said state sensor produces at said input circuit a maximum amplitude signal when said bi-state device is in said first state and a lesser amplitude signal when said bi-state device is in said second state.

19. An apparatus as in claim 18 wherein said inductor is tapped.

20. An apparatus as in claim 19 wherein said tapped inductor has a tap ratio in the range of 5/1 to 20/1.

21. An apparatus as in claim 13 wherein said resonant means includes a capacitor and a variable inductor connected in parallel combination, said variable inductor having an inductance of a first magnitude when said bi-state device is in said first state and an inductance of a second magnitude when said bi-state device is in said second state.

22. An apparatus as in claim 21 wherein said variable inductor has a movable core operable between first and second limits;

said movable core being positioned at said first limit when said bi-state device is in said first state producing on said two wire line a maximum amplitude signal;

said movable core being positioned at said second limit when said bi-state device is in said second state producing on said two wire line a lesser amplitude signal.

23. An apparatus as in claim 22 wherein said variable inductor is tapped.

24. An apparatus as in claim 23 wherein said variable tapped inductor has a tap ratio in the range of 5/1 to 20/1.

* * * * *